April 18, 1933. L. A. HANSON ET AL 1,903,816
FLOAT VALVE
Filed Dec. 28, 1931
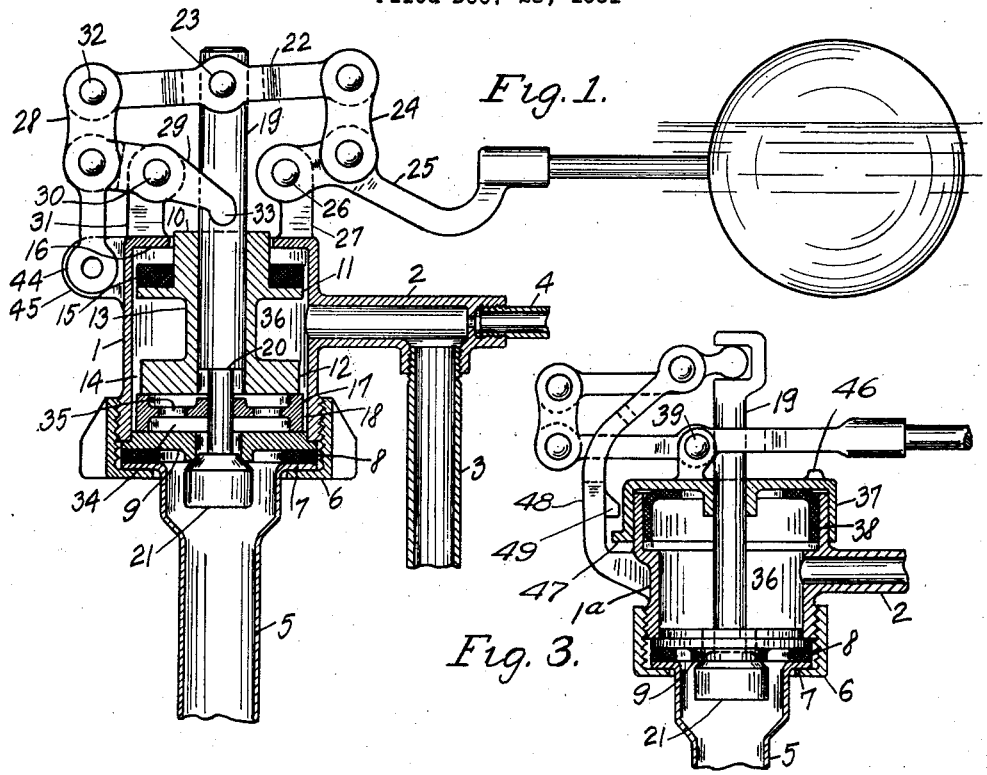
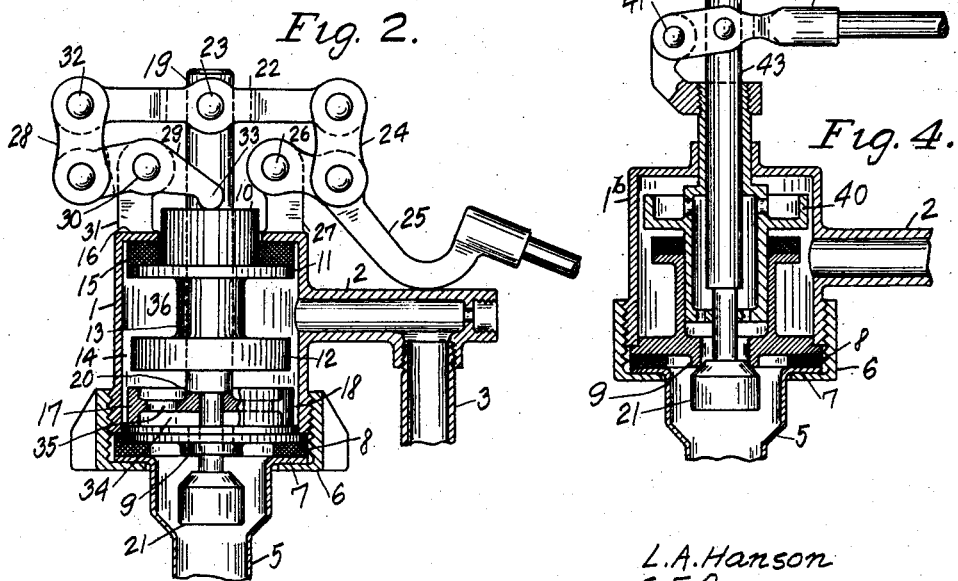
L. A. Hanson
C. F. Osner    INVENTORS
BY Victor J. Evans & Co.
ATTORNEY Patented Apr. 18, 1933

1,903,816

UNITED STATES PATENT OFFICE

LARRY A. HANSON AND CHARLES F. OSNER, OF ALTOONA, PENNSYLVANIA

FLOAT VALVE

Application filed December 28, 1931. Serial No. 583,520.

This invention relates to the float valves and particularly to the class of valves used for controlling the supply of water to water closet tanks.

The primary object of the invention is to provide a valve which closes with the pressure of the water in the supply line, thereby providing a positive closure of the valve at the varying water pressures.

In the accompanying drawing:—

Figure 1 is an elevation and partial longitudinal section of the valve shown in closed position.

Figure 2 is an elevation and partial longitudinal section of the valve shown in open position.

Figure 3 is an elevation and partial longitudinal section of a modified arrangement of the valve shown in closed position.

Figure 4 is an elevation and partial longitudinal section of a modified arrangement of the valve shown in closed position.

Referring more particularly to the drawing, 1 is a cylindrical valve body provided with an integral extension 2 which is adapted to be connected to a tank filling pipe 3 and a bowl refill pipe 4. The lower end of the valve body is adapted to be connected to the water supply pipe 5 by means of a wing nut 6. The wing nut engages a flanged edge 7 of the supply pipe and in cooperation with the gasket 8 holds the valve seat 9 against the lower edge of the valve body, forming a water-tight connection.

The sliding piston 10 consists of an upper 11 and lower 12 cylindrical parts connected by an intermediate part 13 of a smaller diameter.

The lower cylindrical part 12 is of a smaller diameter than the inside diameter of the valve body 1 and provides a circular water passage 14 around itself and the inside walls of the valve body.

The upper cylindrical part 11 of the piston cooperates with a gasket 15 and the flange 16 on the upper end of the valve body 1 which form a stop, limiting the upward movement of the piston.

The cylindrical-shaped auxiliary valve 17 is adapted to slide inside the valve body 1 below the piston 10 and provides a restricted circular water passage 18 around itself and the inside walls of the valve body 1. The area of the passage 18 is smaller than the area of the passage 14. The valve stem 19 is constructed to have the lower part smaller in diameter than the upper part, thus forming a shoulder 20 which is adapted to slidingly engage the auxiliary valve 17. The lower part of the stem is adapted to be connected to the valve head 21 and the upper end of the stem is connected to lever 22 by means of a pin 23. One end of the lever 22 is connected by means of a link 24 to the operating lever 25 which is fulcrumed at pin 26 to a stationary lug 27 on the valve body 1.

The other end of the lever 22 is connected by means of a link 28 to a direction changing lever 29 which is fulcrumed at pin 30 to a stationary lug 31 on the valve body 1.

The operation of the valve is as follows:—

When the tank is flushed, the weight of the float turns the operating lever on its fulcrum 26, lever 22 on fulcrum 23 and lever 29 on fulcrum 30 until the free end 33 of lever 29 comes against the extended top part of piston 10.

In the further downward movement of the float, the pin 32 becomes a fulcrum for the lever 22 and the weight of the float, acting through the operating lever 25, link 24, lever 22 and pin 23, on the valve stem 19 unseats the valve 21.

When the valve is slightly opened, the water from the supply pipe 5 fills the chamber 34, exerting a pressure on the underside of the cylindrical part 12 of the piston 10. This pressure moves the piston upward until it comes to a stop, the upper cylindrical part 11 of the piston resting against the gasket 15 and the flange 16 of the valve body.

The gasket 15 pressed against the flange 16 of the valve body 1 by the pressure of the water, acting on the piston 10, forms a very effective seal and prevents the water squirting from the valve.

The upward movement of the piston 10 pushes the free end 33 of the lever 29 turning the direction changing lever 29 on its fulcrum 30 and through the link 28 moves down the fulcrum pin 32.

Due to the pressure of the water in the chamber 34 the auxiliary valve 17 also moves upward with the piston.

In the subsequent downward movement of the float and the valve stem 19 the shoulder 20 of the valve stem engages the auxiliary valve 17 and moving it downward, separates it from the piston 10.

In this position of the valve parts as shown in Figure 2, the valve is fully open and the water from the supply pipe 5 and chamber 34 passes through the holes 35 in the auxiliary valve 17 and the circular passage 14 around the piston to the tank filling pipe 3.

In the closing movement of the valve, the auxiliary valve 17, due to the suction and the pressure in the chamber 34, follows the upward movement of the stem 19 until it seats itself on the lower cylindrical part 12 of the piston, partly closing the passage 14 and providing a much smaller passage 18 for the water discharge.

Due to the restricted water passage 18 around the auxiliary valve 17, the pressure of the water in the chamber 34 is considerably increased and the upward pressure on the piston 10 becomes correspondingly greater.

At the same time the flow of water through the valve is considerably decreased due to the restriction offered by the auxiliary valve.

The purpose of the auxiliary valve is to reduce the flow of water through the valve at the time of closing, thereby eliminating a possible water hammer, due to a sudden stoppage of a large flow of water.

The further upward movement of the float and the valve stem gradually closes the valve, reducing the supply of water to the chamber 34 and proportionally reducing the water pressure on the piston 10.

In all types of valves, closing with water pressure, the pressure of the water of the supply line acting on the valve head has at all times a tendency to quickly close the valve, the float, moving with the raising level of the water in the tank acting merely as a stabilizer.

In the valve described, the pressure of the water in the supply line on the valve head 21 is transmitted through the stem 19, pin 23 and lever 22 to the links 24 and 28. The upward pull on the link 24 is balanced by weight of the float, acting through the lever 25.

The upward pull on the link 28 acting on one end of the direction changing lever 29 produces a downward force at the free end 33 of the direction changing lever 29 acting on the piston 10 and pushing it down.

This downward force acting on the piston 10 is opposed by the pressure of the water underneath the piston, pushing the piston upwards and holding it against the gasket 15 and the flange 16 on the valve body.

As described above, the water pressure on the piston decreases with the gradual closing of the valve and, at a certain position, when the valve is nearly closed, the downward force at the free end 33 of the lever 29 acting on the piston 10, overcomes the upward pressure of water acting on the piston, the piston moves down releasing the direction changing lever 29 and fulcrum pin 32 and permitting the valve stem 19 to move upward closing the valve.

The total travel of the piston 10 is so proportioned that the piston in its downward movement completely disengages itself from the lever 29.

It should be mentioned that the upward force, acting on the piston 10, is equal to the pressure of water on the full area of the piston (less the area of the stem) and acting against the atmospheric pressure.

The pressure of the water on the piston 10 in the chamber 36 which is partly formed by the upper 11 and lower 12 cylindrical parts of the piston is fully equalized due to the equal areas of the parts and consequently equal and opposite action of the water pressure.

By properly increasing the diameter of the piston and thereby increasing the upward pressure of the water on the piston, the balancing point at which the downward force acting on the piston overcomes the upward pressure of the piston can be made so near the point at which the valve closes, that the flow of water through the valve at the closing time will not be sufficiently large to produce a water hammer, in this simplified arrangement the auxiliary valve becomes unnecessary.

In the modified arrangement of the valve as shown in Figure 3 of the drawing the piston 37 is made in a form of a cap, engaging the valve body 1a on the outside and is made water-tight by means of a packing 38. The piston 37 carries stops 46 and 47 respectively while the arm 48 for the fixed fulcrum in the arrangement of the valve carries a stop 49, the latter coacting with the stop 47 on said piston 37 and the stop 46 coacts with the float arm on the operation of the valve as should be clearly obvious.

The water pressure acting on the valve is balanced by the float, acting on the valve stem through a system of levers.

The levers are so designed that the downward force at the lever fulcrum 39 is opposed by the upward pressure of the water in the chamber 36 acting on the piston 37.

In the modified arrangement of the valve as shown in Figure 4 of the drawing the pressure of the water moves the piston 40 downward in the body 1b instead of upward, as in the valves described above.

This construction permits of a more simplified arrangement of the actuating levers and eliminates the direction changing lever.

The piston 40 in its downward movement pulls downward the fulcrum 41 of the operating lever 42 releasing it when the valve is nearly closed and permitting the stem 43 to move upwards, closing the valve.

As shown in Figure 1 of the drawing the link 28 is provided with a downward extension 44. This extension is adapted to be connected to a stationary lug 45 on the valve body 1 by means of a pin (not shown) and is used only in cases of an extremely low supply water pressure.

By securing the link 44, 28 the fulcrum pin 32 becomes stationary not depending on the movement of the piston, and the closing action of the valve depends only on the buoyancy of the float.

The construction of the valve parts and especially the design of the actuating levers readily lends itself to a variety of arrangements, but the fundamental principle of operation and design essentially consists of a valve, actuated by a system of power-multiplying levers, connected to a float and a water pressure piston located on the discharge side of the valve.

The piston moves and holds stationary one of the fulcrums of the actuating levers during the time of operation of the valve, releasing the fulcrum at the time of the closing of the valve, thereby also releasing the levers and permitting the valve stem a sufficient free movement to close the valve.

What is claimed is:—

1. In a fluid pressure operated valve mechanism, a casing, a valve controlling the fluid supply to the casing, a valve seat, a float operated by the fluid supply delivered from the casing, a system of actuating levers connecting the float and the fluid controlling valve, a fluid pressure piston on the discharge side of the valve seat, and means for transmitting the movement of the piston to one of the fulcrums of said system of actuating levers.

2. In a fluid pressure operated valve mechanism, a casing, a movable piston therein, a pressure fluid flow control beneath the piston, a valve controlling the fluid supply to the casing and having a stem regulating the control, a float operated by the fluid supply delivered from the casing, and a lever arm connecting the float and the valve stem, the fulcrum of said lever arm coacting with the movable piston.

3. In a fluid pressure operated valve mechanism, a casing, a movable piston therein, a valve controlling the fluid supply to the casing and having a stem movable through the piston, a float operated by the fluid supply delivered from the casing, a lever arm connecting the valve stem and the float, the fulcrum of said lever arm coacting with the movable piston by means of an intermediate lever, and a pressure fluid control within the casing and regulated by the valve stem, said control having a fluid opening smaller than the fluid opening in the seat of the valve controlling the supply to the casing.

4. In a fluid pressure operated valve mechanism, a casing, a valve controlling the fluid supply to the casing, a float operated by the fluid supply delivered from the casing, a movable fluid pressure piston on the discharge side of the valve, and a valve actuating lever arm connecting the float and the valve stem, the fulcrum of said lever arm coacting with the movable piston.

5. In a fluid pressure operated valve mechanism, a casing, a valve controlling the fluid supply to the casing, a float operated by the fluid supply delivered from the casing, a movable fluid pressure piston, and a valve actuating lever arm connecting the float and the valve stem, the fulcrum of said lever arm coacting with the movable piston by means of an intermediate lever.

6. In a fluid pressure operated valve mechanism, a casing, a valve controlling the fluid supply to the casing, a float operated by the fluid supply delivered from the casing, a movable fluid pressure piston, and a change fulcrum connection between the valve stem and float and coacting with the piston.

In testimony whereof we affix our signatures.

LARRY A. HANSON.
CHARLES F. OSNER.